Patented June 4, 1946

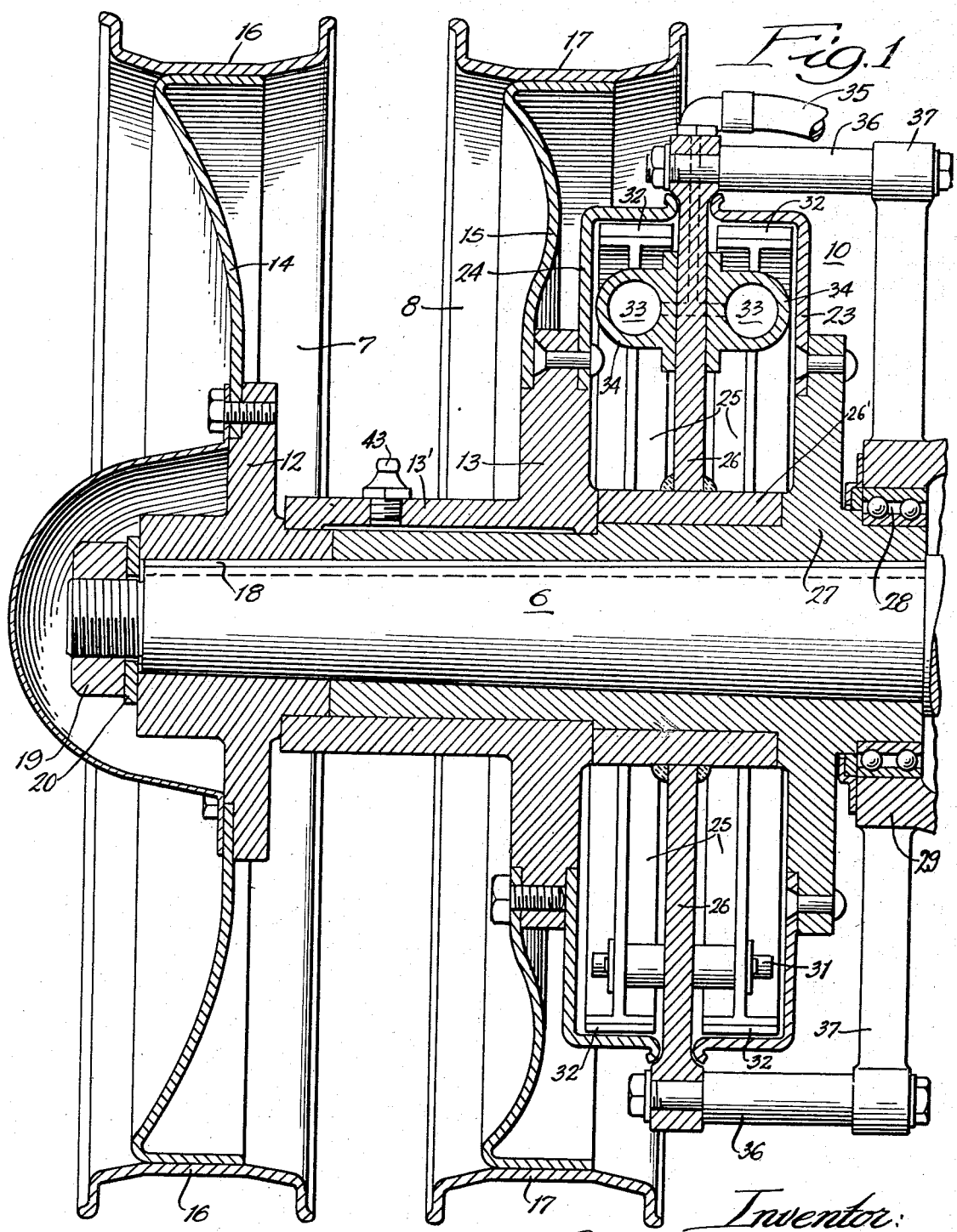

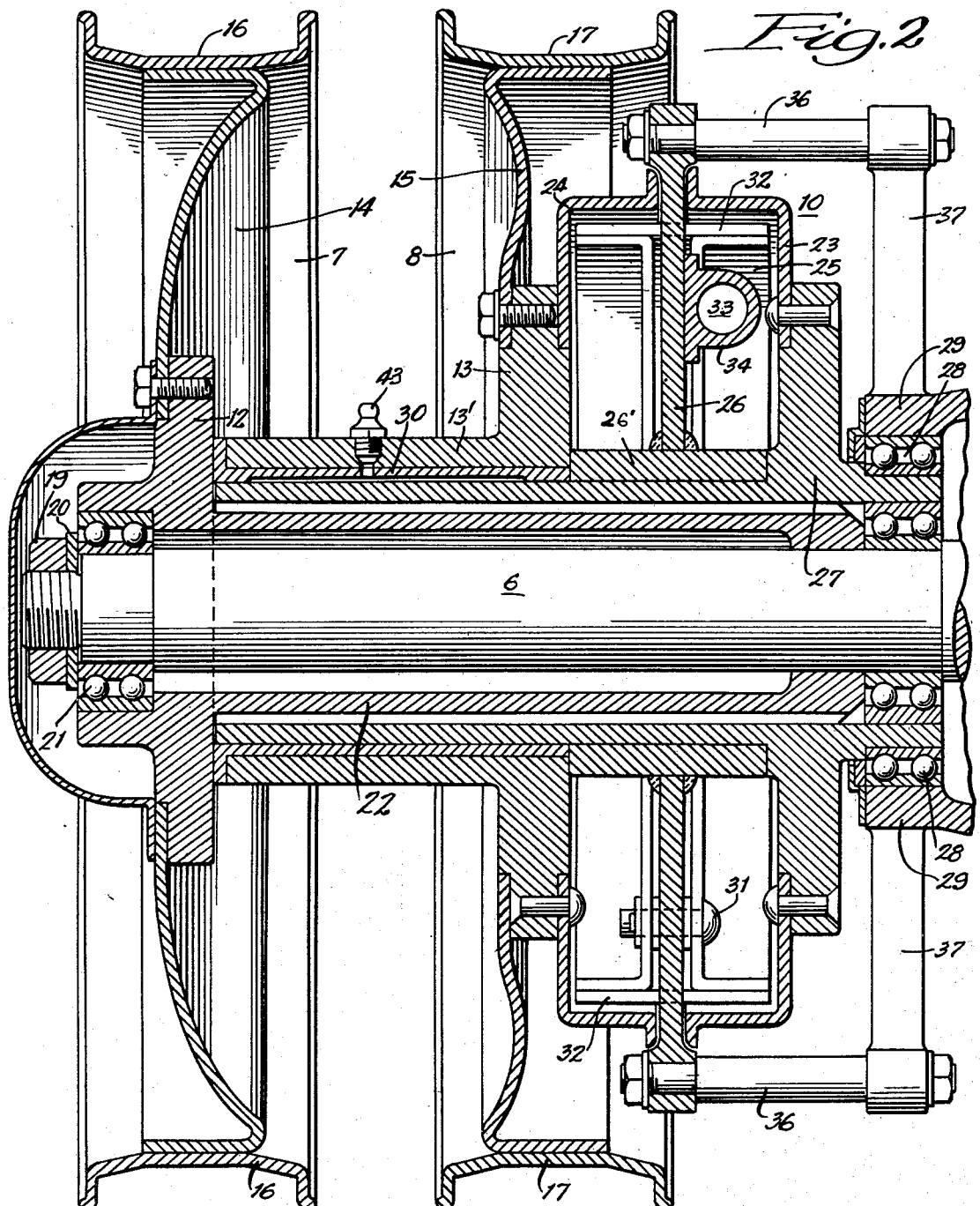

2,401,488

UNITED STATES PATENT OFFICE 2,401,488

MOTOR VEHICLE WHEEL MECHANISM

Frank M. Lewis, White Cloud, Mich.

Application February 8, 1943, Serial No. 475,059

2 Claims. (Cl. 180—22)

This invention relates particularly to dual wheel mechanism for motor driven trucks, tractors, and trailers. In structures of this kind in use at the present time and in the past a number of problems have been encountered in an attempt to increase either the effectiveness or the life of such wheel mechanism. Where it has been desired to drive both wheels, of a dual wheel mechanism, the two wheels have been rigidly interconnected. This has made impossible any differential action between the two wheels. The result has been an excessive wear on the tires of the outer wheel when the vehicle was making curves or turning corners. On the other hand, where present or past dual mechanisms have been arranged to provide for a differential action between the two wheels, no satisfactory provision has been made for either driving or braking both of the wheels.

Accordingly, the main objects of this invention are to provide an improved combination dual wheel and brake mechanism for motor vehicles having constant differential action between them at all times; and to provide an improved wheel and brake mechanism of this kind which permits one or both of the wheels to be driven.

In the particular embodiment of the invention herein shown:

Fig. 1 is a cross-sectional view of my improved combination dual wheel and brake mechanism suitable for use on a motor vehicle with a driven axle;

Fig. 2 is a similar view showing an adaptation of my improved combination dual wheel and brake mechanism for use on trailers, where the shaft is fixed and the wheels rotated thereon.

The preferred embodiment of my invention comprises a shaft 6 which provides the support for a pair of wheel hub members 7 and 8, the effective, simultaneous braking of which is accomplished by means of a brake mechanism 10.

The shaft 6 may be a tapered form as shown in Fig. 1, or it may be a straight form as shown in Fig. 2. When this improved combination dual wheel and brake mechanism is used on trucks or tractors, the shaft 6 would be driven in the usual manner, being connected to drive the outer wheel 7. In case this combination dual wheel and brake mechanism is to be used on a trailer, the shaft 6 would be fixed in a manner characteristic with such vehicle structures and the wheel hub members would revolve thereon.

The wheel hub members 7 and 8 are of a more or less conventional construction. These comprise the respective hub bearings 12 and 13 to which are secured the respective disc elements 14 and 15 upon which are supported the rims 16 and 17. It will be noted, in the drawings, that the discs 14 and 15 are shown bolted to the respective hub bearings 12 and 13 and welded to the respective rims 16 and 17. Other modes of attaching these several parts may be used without affecting the essence of my invention.

The form of the hub bearings 12 and 13 vary somewhat depending upon whether the vehicles are to be used on a driven or on a fixed shaft 6. In the adaptation shown in Fig. 1, the hub bearing 12 is fixed on the end of the shaft 6 by means of a key 18. It is held against axial displacement by a nut 19 and a washer 20 secured to the end of the shaft 6. In the adaptation presented in Fig. 2, for use with a stationary shaft, the wheel hub bearing 12 is rotatably supported on the end of the shaft 6 by suitable ball or roller bearings 21. The hub bearing is retained against axial displacement by the nut 19 and the washer 20. An integral sleeve 22 extends inwardly along and around the shaft 6, the purpose of which is to reduce the likelihood of wobble for the wheel mounted on the rim 16.

The wheel hub member 13 is formed with an outwardly extended sleeve 13' and coacts to rotatably support the hub member 13 co-axially with but independently of the wheel hub member 12.

The brake mechanism 10, which is an all-important feature of my invention, comprises a pair of brake drums 23 and 24 with which are cooperatively arranged a pair of brake arms 25. These may be of a more or less conventional type, shiftably supported on a supporting bar 26 and operated by any conventional fluid or mechanical brake-shifting mechanism to simultaneously arrest the rotation of the respective wheel hub members 12 and 13. The brake drums are of identical complementary form and are located in opposed relationship inwardly of the wheel hub member 13.

The brake drum 23 is secured to a bearing support or sleeve 27 which is connected to rotate with the wheel hub member 12. This bearing support or sleeve 27 is rotatably supported on ball or roller bearings 28 mounted on the shaft-housing 29. In the adaptation shown in Fig. 1, this fixed relationship of the bearing support 27 and the hub member 12 is effected by means of the key 18. It secures both parts in rotatable relationship with the shaft 6. In the adaptation shown in Fig. 2, the bearing support 27 is splined to the extension sleeve 22 so as to rotate therewith. Thus these parts operate as a unit, but are made separable in order to permit the assembling and dismantling of the wheel structures.

The bearing support 27 also serves as a bearing for the wheel hub member 13 and its sleeve extension 13'. In the adaptation shown in Fig. 2, a bronze bearing 30 is inserted between the sleeve extension 13' and the bearing member 27.

The brake drum 24 is secured to the adjacent wheel hub member 13 in the manner indicated.

The operating means for the brake mechanism 10 may be of any conventional type, either mechanical, hydraulic, or air. Accordingly, the embodiment herein shown is intended to be essentially illustrative. To that end brake levers 25 are shown with their lower ends pivoted at 31 to the supporting bar 26. These levers 25 are of the usual arc-shaped form and so arranged that when their outer upper ends are pushed apart, the brake bands 32 are forced outwardly against the inner peripheries of the brake drums 23 and 24 in the conventional manner, somewhat comparable to what is shown in patent to E. L. Miller 2,243,569, issued May 27, 1941.

Inasmuch as hydraulic or air brakes are preferred for the heavier type of vehicles for which dual wheel mechanism is so advantageous, the brake levers 25 are herein shown to be operated by pairs of oppositely movable pistons 33 mounted in cylinders 34 and connected by suitable links (not shown) to said brake levers 25. A suitable hose connection 35 is indicated for the application of air or liquid pressure to the pistons 33.

The brake levers 25 on each side of the shaft 6 and located within opposed brake drums may be operated by one pair of oppositely moving pistons 33 as indicated in Fig. 1, or they may be connected together in pairs and be operated by a single piston 33 as indicated in Fig. 2.

The supporting bar 26, comprising a pair of oppositely-disposed radial arms welded to the hub member 26' is held in place between the opposed brake drums 23 and 24 by means of pins 36 extending outwardly from arms 37 supported on the shaft-housing 29. This bar 26 provides a support for the pivot pins 31 for the brake levers 25 and for the hydraulic cylinders 34.

In the adaptation shown in Fig. 1 only the outer wheel hub member 12 is driven. The other wheel hub member 13 is free to rotate. However, both have the brake mechanism 10 applied simultaneously and with equal force, thus insuring the most effective retardation of the vehicle when occasion demands. In this adaptation the brake levers 25 are of T shape cross section and are connected to separate brake shoes 32, engageable with the respective brake drums 23 and 24.

In the adaptation shown in Fig. 2 which is suitable particularly for trailers, both wheel hub members 12 and 13 are free to rotate as traction with the highway may permit. However, as in the other adaptation, the brake mechanism 10 will be applied simultaneously and uniformly to both wheel hub members as occasion may demand. In this adaptation the brake levers 25 are of L shape cross section and are connected to a single brake shoe 32 which simultaneously engages both brake drums 23 and 24. In this latter construction both pairs of brake levers may be operated by a single hydraulic element. The oppositely shiftable pistons would be connected by appropriate link mechanisms to both brake shoes on the corresponding sides of the supporting bar 26.

A plug 43 normally closes an aperture through which suitable lubricant may be introduced to the rotating parts of the wheel mechanism.

The operation of this dual wheel and brake mechanism combination will be apparent, it is believed, from the foregoing description.

I claim:

1. A dual wheel mechanism for motor vehicles comprising a driving shaft journaled in a housing, an outer wheel hub keyed to rotate with said shaft, a sleeve also keyed to rotate with said shaft, an inner wheel hub journaled on said sleeve, a pair of opposed brake drums located inwardly of said inner wheel hub, the outer of said brake drums being fixed to rotate with said inner wheel hub, the inner of said brake drums being fixed to rotate with said sleeve, a brake-supporting bar suspended between said brake drums from arms secured on said shaft housing, and brake mechanism carried by said bar for simultaneously shifting into and out of engagement with said brake drums.

2. A dual wheel mechanism for motor vehicles comprising, a shaft mounted in a housing, a pair of wheels mounted adjacent to each other on said shaft and adapted to rotate independently of each other, a pair of opposed brake drums located inwardly of the inner wheel, the outer of said brake drums being fixed to rotate with said inner wheel, the inner of said brake drums being fixed to rotate with the outer wheel, a brake-supporting bar suspended between said brake drums from arms secured on said housing, and brake mechanism carried by said bar for simultaneously shifting into and out of engagement with said brake drums.

FRANK M. LEWIS.